United States Patent
Casci et al.

(10) Patent No.: US 10,258,973 B2
(45) Date of Patent: Apr. 16, 2019

(54) LOW PHOSPHORUS CHABAZITES

(71) Applicants: John L. Casci, Billingham (GB);
Hai-Ying Chen, Wayne, PA (US);
Joseph Michael Fedeyko, Wayne, PA (US); Jillian Elaine Collier, Reading (GB); Raj Rao Rajaram, Reading (GB); David Thompsett, Reading (GB); Robert P. Hodgkins, Colima (MX)

(72) Inventors: John L. Casci, Billingham (GB);
Hai-Ying Chen, Wayne, PA (US);
Joseph Michael Fedeyko, Wayne, PA (US); Jillian Elaine Collier, Reading (GB); Raj Rao Rajaram, Reading (GB); David Thompsett, Reading (GB); Robert P. Hodgkins, Colima (MX)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/881,845

(22) Filed: Jan. 29, 2018

(65) Prior Publication Data
US 2018/0147569 A1 May 31, 2018

Related U.S. Application Data

(63) Continuation of application No. 14/991,272, filed on Jan. 8, 2016, now Pat. No. 9,878,316, which is a continuation of application No. 14/236,734, filed as application No. PCT/US2012/048313 on Jul. 26, 2012, now Pat. No. 9,254,481.

(60) Provisional application No. 61/512,229, filed on Jul. 27, 2011.

(51) Int. Cl.
| | | |
|---|---|---|
| *C01B 39/54* | (2006.01) |
| *B01J 29/76* | (2006.01) |
| *B01D 53/94* | (2006.01) |
| *C01B 39/10* | (2006.01) |
| *B01J 37/28* | (2006.01) |
| *B01J 29/70* | (2006.01) |
| *C01B 39/04* | (2006.01) |
| *B01D 53/86* | (2006.01) |
| *B01J 29/85* | (2006.01) |
| *B01J 29/88* | (2006.01) |
| *B01J 35/04* | (2006.01) |
| *B01J 37/02* | (2006.01) |

(52) U.S. Cl.
CPC ........ *B01J 29/763* (2013.01); *B01D 53/8628* (2013.01); *B01D 53/9418* (2013.01); *B01J 29/7015* (2013.01); *B01J 29/85* (2013.01); *B01J 29/88* (2013.01); *B01J 35/04* (2013.01); *B01J 37/28* (2013.01); *C01B 39/04* (2013.01); *C01B 39/10* (2013.01); *C01B 39/54* (2013.01); *B01D 2251/2062* (2013.01); *B01D 2251/2067* (2013.01); *B01D 2255/20738* (2013.01); *B01D 2255/20761* (2013.01); *B01D 2255/50* (2013.01); *B01D 2255/707* (2013.01); *B01J 37/0246* (2013.01); *B01J 2229/183* (2013.01); *B01J 2229/186* (2013.01); *Y02T 10/24* (2013.01)

(58) Field of Classification Search
CPC ........ C01B 39/10; C01B 39/54; B01J 29/763; B01J 29/7015; B01J 29/85; B01J 2229/183; B01J 2229/186; B01D 53/9418; B01D 53/8628
See application file for complete search history.

(56) References Cited

U.S. PATENT DOCUMENTS

| 4,440,871 A * | 4/1984 | Lok | B01J 20/18 |
| | | | 208/114 |
| 4,544,538 A * | 10/1985 | Zones | B01J 29/70 |
| | | | 423/706 |
| 9,254,481 B2 * | 2/2016 | Casci | C01B 39/54 |
| 9,878,316 B2 * | 1/2018 | Casci | B01J 37/28 |

* cited by examiner

*Primary Examiner* — David M Brunsman

(57) ABSTRACT

A catalyst washcoat is provided having a molecular sieve with a CHA crystal structure; about 0.5 to about 5.0 mol % phosphorus; and $SiO_2$ and $Al_2O_3$ in a mole ratio of about 5 to about 40. The washcoat includes one or more promoters or stabilizers, and may be applied to a monolith substrate to produce a catalytically active article.

20 Claims, 5 Drawing Sheets

LOW PHOSPHORUS CHABAZITES

CROSS-REFERENCE TO RELATED APPLICATIONS

This application is a continuation of the U.S. patent application Ser. No. 14/991,272, filed Jan. 8, 2016, and allowed on Sep. 28, 2017, now U.S. Pat. No. 9,878,316, which is a continuation of U.S. patent application Ser. No. 14/236,734, filed on Feb. 3, 2014, and issued on Feb. 9, 2016, now U.S. Pat. No. 9,254,481, which is the National Phase of PCT International Application No. PCT/US2012/048313, filed Jul. 26, 2012, and claims priority benefit of U.S. Provisional Patent Application No. 61/512,229, filed Jul. 27, 2011 the disclosures of each of which are incorporated herein by reference in their entireties for all purposes.

BACKGROUND

A.) Field of Use

The present invention relates to catalysts, systems, and methods that are useful for treating an exhaust gas which occurs from combusting hydrocarbon fuel—more particularly exhaust gas containing nitrogen oxides, such as an exhaust gas produced by diesel engines, gas turbines, or coal-fired power plants.

B.) Description of Related Art

Exhaust gas is emitted when fuels such as natural gas, gasoline, diesel fuel, fuel oil or coal is combusted and is discharged into the atmosphere through an exhaust pipe, flue gas stack or the like. The largest portions of most combustion exhaust gas contain relatively benign nitrogen ($N_2$), water vapor ($H_2O$), and carbon dioxide ($CO_2$); but the exhaust gas also contains in relatively small part noxious and/or toxic substances, such as carbon monoxide (CO) from incomplete combustion, hydrocarbons (HC) from unburnt fuel, nitrogen oxides ($NO_x$) from excessive combustion temperatures, and particulate matter (mostly soot). Of particular relevance to the present invention is an exhaust gas containing NOx, which includes nitric oxide (NO), nitrogen dioxide ($NO_2$), and nitrous oxide ($N_2O$), that is derived from lean burn engines such as diesel engines for mobile applications.

Often, systems for treating diesel engine exhaust gas include one or more catalyst compositions coated on or diffused into a substrate to convert certain or all of the noxious and/or toxic exhaust components into innocuous compounds. One such conversion method, commonly referred to as Selective Catalytic Reduction (SCR), involves the conversion of $NO_x$ in the presence of a catalyst and with the aid of a reducing agent into elemental nitrogen ($N_2$) and water. In an SCR process, a gaseous reductant, typically anhydrous ammonia, aqueous ammonia, or urea, is added to an exhaust gas stream prior to contacting the catalyst. The reductant is absorbed onto a catalyst and the $NO_x$ reduction reaction takes place as the gases pass through or over the catalyzed substrate. The chemical equation for a stoichiometric reaction using either anhydrous or aqueous ammonia for an SCR process is:

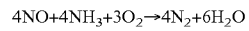

$4NO+4NH_3+3O_2 \rightarrow 4N_2+6H_2O$

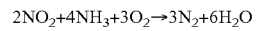

$2NO_2+4NH_3+3O_2 \rightarrow 3N_2+6H_2O$

$NO+NO_2+2NH_3 \rightarrow 2N_2+3H_2O$

Known SCR catalysts include zeolites or other molecular sieves disposed on a monolithic substrate. Molecular sieves are microporous crystalline solids with well-defined structures and generally contain silicon, aluminum and oxygen in their framework and can also contain cations within their pores. A defining feature of molecular sieves is that their frameworks are made up of interconnected networks of molecular tetrahedrals. Aluminosilicate molecular sieves, for example, are arranged as an open network of corner-sharing $[AlO_4]$- and $[SiO_4]$-tetrahedrals. In the case of a silica tetrahedral, a silicon atom is at the center of the tetrahedral while the four surrounding oxygen atoms reside at the tetrahedral's corners. Two or more tetrahedrals can then be linked together at their corners to form various crystalline structures.

A molecular sieve framework is defined in terms of the geometric arrangement of its primary tetrahedral atoms "T-atoms" (e.g., Al and Si). Each T-atom in the framework is connected to neighboring T-atoms through oxygen bridges and these or similar connections are repeated to form a crystalline structure. Since the framework per se is merely the arrangement of these coordinated atoms, specific framework types do not expressly depend on composition, distribution of the T-atoms, cell dimensions or symmetry. Instead, a particular framework is dictated solely by the geometric arrangement of T-atoms. (Codes for specific framework types are assigned to established structures that satisfy the rules of the IZA Structure Commission.) However, materials of differing compositions, but arranged according to the same framework, can possess very different physical and/or chemical properties.

Crystalline structures can be formed by linking individual unit cells of the same or different frameworks together in a regular and/or repeating manner. These crystalline structures may contain linked cages, cavities or channels, which are of a size to allow small molecules to enter—e.g. the limiting pore sizes can be between 3 and 20 Å in diameter. The size and shape of these microporous structures are important to the catalytic activity of the material because they exert a steric influence on the reactants, controlling the access of reactants and products.

Of particular interest to the present invention are small pore molecular sieves, such as those having a chabazite (CHA) framework. Two particular materials that have CHA frameworks, the aluminosilicate SSZ-13 and the silicoaluminophosphate SAPO-34, are known to be useful in SCR processes for converting $NO_x$ to $N_2$ and $O_2$ and for other catalytic processes and each has separate advantages.

In addition to their porosity, molecular sieves often have other elements introduced as extra-framework constituents to improve their catalytic performance. For example, U.S. Pat. No. 5,472,594 suggests that incorporating phosphorus into a ZSM-5 zeolite provides a composition having unique properties as a catalytic agent. However, the phosphorus described in the '594 patent is not present as a crystalline framework constituent i.e., it has not been substituted for silicon or aluminum atoms. Likewise U.S. Pat. No. 7,662,737 describes ZSM-5 having free phosphate and/or phosphates bonded to extra-framework aluminum. Other examples of extra-framework constituents include metals, such as copper or iron.

Thus, a need remains for improved hydrothermally stable small pore molecular sieves having a high degree of catalytic activity.

SUMMARY OF THE INVENTION

Applicants have discovered a new, low-phosphorus molecular sieve having a CHA framework ([Al—Si—P—

O]-CHA). The novel molecular sieve contains a small amount of phosphorus in CHA framework comprising mostly silica and alumina. The presence of a small amount of phosphorus in the framework was found to increase the molecular sieve's hydrothermal stability of its Si/Al counterpart and provides similar or improved catalytic performance. In addition, applicants have discovered that phosphorus T-atoms concentrated in discrete regions (i.e., clusters) of a crystal vis-à-vis evenly distributing the phosphorus atoms throughout a crystal improves the performance of the material. Such materials have been found to be particularly useful for reducing NOx in exhaust gas generated by diesel engines.

Accordingly, provided is a composition comprising a crystalline structure, wherein at least a portion of the crystalline structure is a molecular sieve having a CHA framework consisting of thirty-six T-atoms selected from the group consisting of silicon, aluminum, and phosphorus; wherein said molecular sieve comprises about 0.05 to about 5.0 mole percent of framework phosphorus based on the total moles of framework silicon, aluminum, and phosphorus in said molecular sieve; and wherein said molecular sieve has a silica-to-alumina mole ratio of at least about 10. Here, a crystalline structure per se contains a low concentration of phosphorus and thus the composition is not merely a physical mixture or blend of an aluminosilicate and a conventional silicoaluminophosphate, such as SAPO-34. Preferably the phosphorus is present as $PO_2$. More preferably, the $PO_2$ is heterogeneously distributed in individual crystals of the CHA molecular sieve.

In another aspect of the invention, provided is a composition comprising a molecular sieve material having a CHA framework, wherein the framework consists of periodic building units having 36 interlinked T-atoms selected from the group consisting of aluminum, silicon, and phosphorus, and wherein said molecular sieve material has a mean phosphorus concentration of about 0.5 to about 1.4 atoms per periodic building unit, preferably from about 1.1 to about 1.3.

In yet another aspect of the invention, provided is a molecular sieve composition comprising —$SiO_2$, —$AlO_2$, and —$PO_2$ in a CHA framework and a silica-to-alumina ratio greater than about 10, preferably about 10 to about 500, more preferably about 10 to about 50, and even more preferably about 10 to about 32.

Other aspects of the invention include a catalytically active washcoat comprising the abovementioned low-phosphorus molecular sieve; a catalytically active article, such as a wall flow or flow through filter, comprising a catalytically active washcoat; and an engine exhaust gas treatment system comprising the catalytically active article and a source of ammonia.

Also provided is a method for reducing NOx in an exhaust gas comprising contacting the gas with a catalyst described herein for a time, temperature, and reducing environment sufficient to reduce the level of NOx compounds in the gas.

DETAILED DESCRIPTION OF PREFERRED EMBODIMENTS OF THE INVENTION

The present invention relates to a novel crystalline material having a CHA framework and a relatively small amount of framework phosphorus. In its calcined and anhydrous form, the crystalline material of the present invention has a composition involving the molar relationship:

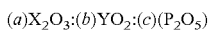

wherein X is a trivalent element, such as aluminum, boron, iron, indium, and/or gallium, preferably aluminum; Y is a tetravalent element, such as silicon, tin, titanium and/or germanium, preferably silicon; c is about 0.005 to about 0.050 (0.05-5 mol. %), preferably about 0.015 to about 0.050 (1.5-5 mol. %), more preferably about 0.020 to about 0.036 (2-3.6 mol. %), and even more preferably about 0.026 to about 0.030 (2.6 to 3 mol. %) or about 0.031 to about 0.035 (3.1 to 3.5 mol. %); a+b+c=1.00; and the ratio of b:a is at least about 5, preferably about 5 to about 40. Unlike the chabazite SSZ-13, which has no phosphorus (U.S. Pat. No. 4,544,538) and its analog SAPO-34 which preferably has a minimum phosphorus content of much greater than 25 mol. % (U.S. Pat. No. 4,440,871), the novel molecular sieve of the present invention has a phosphorus content of about 0.5 to about 5 mole percent and preferably an SAR of at least 5. The molecular sieve of the present invention possesses uniquely beneficial physical and chemical properties compared to its closest molecular sieve analogs and thus represents a novel composition having a CHA framework.

Figure 1A:
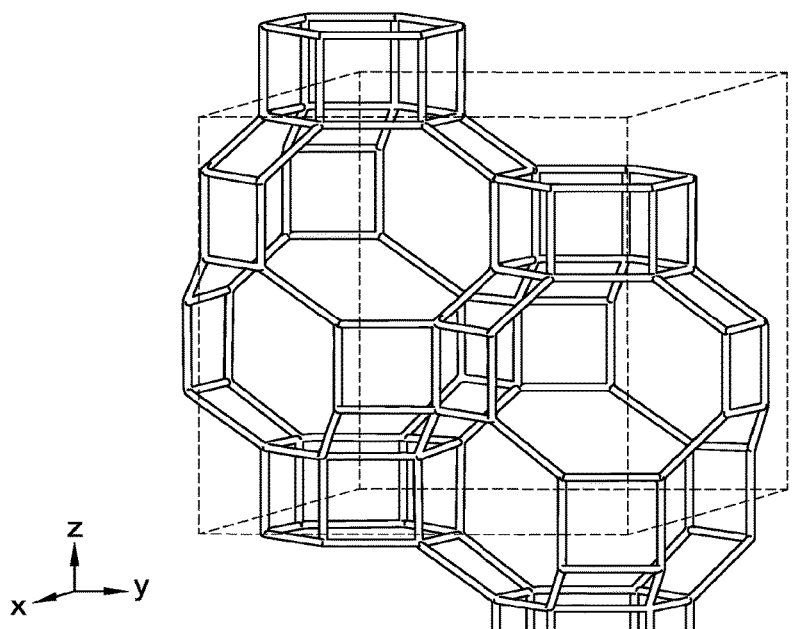
FIG. 1A is drawing of a unit cell having a CHA framework.

Composition:

Referring to FIG. 1A, shown is a unit cell of a CHA framework as defined by the International Zeolite Association (IZA). Each unit cell of the CHA framework has 36 tetrahedral subunits, wherein each subunit has a central T-atom, preferably selected individually from Al, Si, and P. Preferably, individual crystals of the CHA crystalline material have a mean phosphorus concentration of about 0.5 to about 2.0 per unit cell, more preferably from about 1.0 to about 1.5 per unit cell, and even more preferably from about 1.1 to about 1.3 per unit cell. The position of the phosphorus atom(s) in the framework is not particularly limited. That is, the phosphorus atom(s) can be disposed at any position(s) in the framework. Although each unit cell can contain one or more phosphorus atoms, the present invention is not so limited. Alternatively, the present invention includes crystalline materials having unit cells with no phosphorus atoms, provided that the mean phosphorus content of individual crystals is within the ranges described above.

Figure 1B:
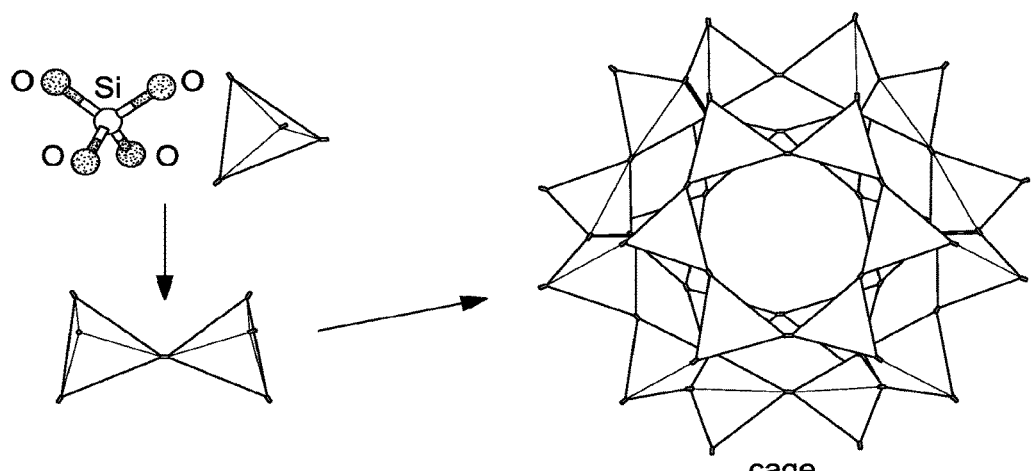
FIG. 1B is drawing of tetrahedral structure based on T-atoms and an exemplary interconnection via oxygen bridges.
Figure 1C:
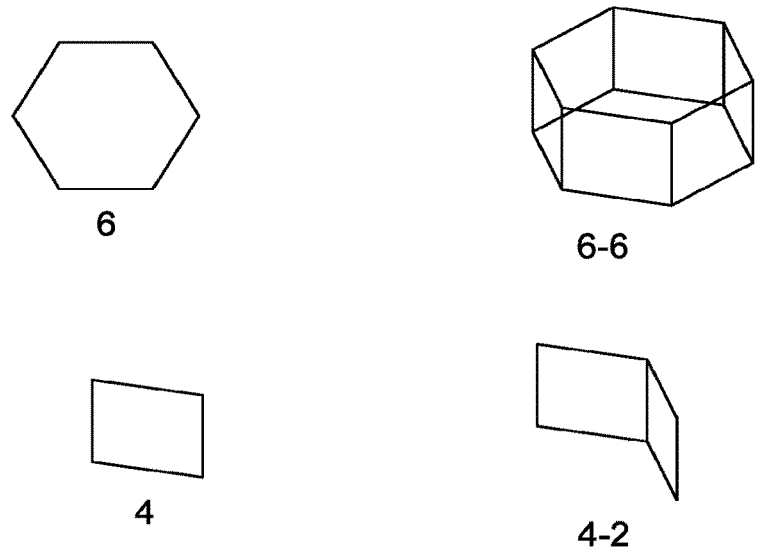
FIG. 1C is a drawing of secondary building units.
Figure 1D:
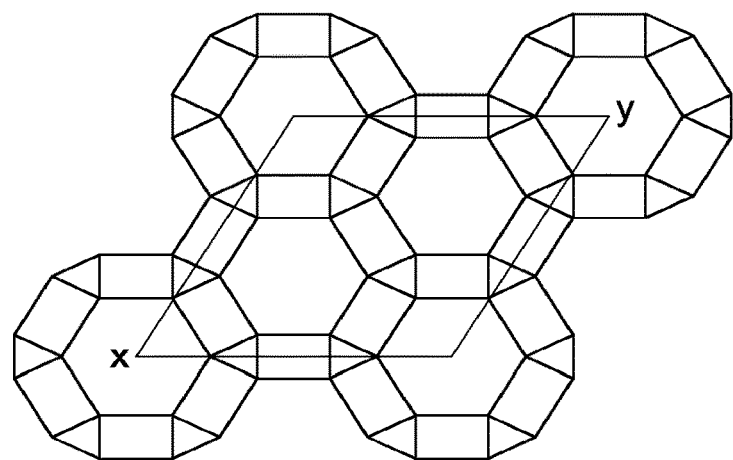
FIG. 1D is a drawing of interconnected CHA unit cells forming a crystalline structure.

The 36 tetrahedral subunits are connected via oxygen bridges (i.e., co-sharing of oxygen atoms between two or more T-atoms) to form secondary building units such as hexagons, stacked hexagons, squares, or bent rectangles, referred to in IZA nomenclature as (6), (6-6), (4), and (4-2), respectively (FIG. 1C). These secondary building units are connected in the specific arrangement to produce a three-dimensional unit cell of according to the defined CHA framework (FIG. 1A). A plurality of unit cells are connected in a three-dimensional array to form a molecular sieve crystal (FIG. 1D).

Preferably, unit cells are based primarily on [AlO$_4$]- and [SiO$_4$]-moieties having a tetrahedral structure (FIG. 1B). Since most of these tetrahedral structures are connected to one another via oxygen bridges, most tetrahedrals will share oxygen atom corners. Accordingly, a majority of the unit cell comprises repeating —SiO$_2$ and/or —AlO$_2$ moieties. A molecular sieve according to the present invention can be obtained with the desired silica-to-alumina ratio (SAR) (i.e., for the desired catalytic application) by adjusting the synthesis parameters. In certain embodiments, the molecular sieve has an SAR of at least about 5, more preferably from about 5 to about 150, more preferably from about 5 to about 50, more preferably from about 5 to about 40. In certain preferred embodiments, the molecular sieve has an SAR of about 5 to about 32. In certain other preferred embodiments, the molecular sieve has an SAR of about 10 to about 32. As used herein, the term silica refers to [SiO$_4$]- and/or —SiO$_2$ framework moieties, and the term alumina refers to [AlO$_4$]—, —AlO$_2$, and/or Al$_2$O$_3$ framework moieties.

Interspersed in at least a portion of the unit cells are one or more phosphorus atoms. These phosphorus atoms preferably reside at T-atom positions and are preferably linked to aluminum atoms via oxygen bridges. Preferably the phosphorus is present as PO$_2$ moieties, more preferably as PO$_2$ paired with one or more AlO$_2$ moieties. It is believed that inter-exchanging aluminum atoms of the molecular sieve with phosphorus atoms increases the hydrothermal stability and/or catalytic performance of the molecular sieve. Thus, in certain preferred embodiments, the molecular sieve comprises at least about 80 mol. % SiO$_2$ and not more than about 20 combined mol. % of said AlO$_2$ and said PO$_2$, preferably about 80 to about 90 mol % SiO$_2$ and about 10 to about 20 combined mol. % of said AlO$_2$ and said PO$_2$, wherein the combined mol. % of said AlO$_2$ and said PO$_2$ contains from about 0.5 to 5.0 mol. % PO$_2$, based on the total combined moles of silicon, aluminum, and phosphorus. In certain embodiments, the molecular sieve comprises about 85 to about 88 mol % of said SiO$_2$, about 12 to about 15 combined mol. % of said AlO$_2$ and said PO$_2$, wherein the combined mol. % of said AlO$_2$ and said PO$_2$ contains from about 0.5 to 5.0 mol. % PO$_2$, based on the total combined moles of silicon, aluminum, and phosphorus.

In certain embodiments, the molecular sieve composition comprises SiO$_2$, AlO$_2$, and PO$_2$ in a CHA framework; a silica-to-alumina ratio of about 12 to about 32; and an amount of phosphorus in said framework to produce a mean number of cation exchange site per periodic building unit of about 0.5 to about 4.

In certain embodiments, molecular sieve crystals have a mean crystal size of greater than 0.05 microns, preferably greater than 0.5 microns. Preferred molecular sieves have a mean crystal size of at least 1.0 μm. In certain embodiments, the molecular sieves have a mean crystal size of about 1.0 μm to about 5.0 μm, and more preferably about 1.5 μm to about 2.5 μm, as calculated by methods described herein below. The accurate direct measurement of the crystal size of molecular sieve materials is frequently very difficult. Microscopy methods, such as SEM and TEM, may be used. These methods typically require measurements of a large number of crystals and, for each crystal measured, values may be evaluated in up to three dimensions. Furthermore, in order to more completely characterize the crystal size of a batch of crystals, one should calculate the average crystal size, as well as the degree of variance from this average in terms of a crystal size distribution. For example, measurement by SEM involves examining the morphology of materials at high magnifications (typically 1000× to 10,000×).

The SEM method can be performed by distributing a representative portion of the molecular sieve powder on a suitable mount such that individual particles are reasonably evenly spread out across the field of view at 1000× to 10,000× magnification. From this population, a statistically significant sample (n) of random individual crystals (e.g., 200) are examined and the longest dimension of the individual crystals parallel to the horizontal line of the straight edge are measured and recorded. (Particles that are clearly large polycrystalline aggregates should not be included the measurements.) Based on these measurements, the arithmetic mean and the variance of the sample are calculated. In certain embodiments, the sample also has a mathematical variance about the mean of less than 1, preferably less than 0.5, and even more preferably less than 0.2.

In one embodiment, at least one non-aluminum base metal is used in conjunction with the molecular sieve to increase the catalyst's performance. As used herein, the phrase "molecular sieve catalyst containing at least one a non-aluminum base metal" means a molecular sieve structure to which one or more base metals other than aluminum has been added by ion exchange, impregnation, isomorphous substitution, etc. Moreover, the terms "base metal-containing molecular sieve catalyst" and "molecular sieve catalyst containing at least one base metal" are used interchangeably herein. As used herein, the term "base metal" means at least one transition metal selected from copper, lead, nickel, zinc, iron, tin, tungsten, cerium, molybdenum, tantalum, magnesium, cobalt, bismuth, cadmium, titanium, zirconium, antimony, manganese, chromium, vanadium, ruthenium, rhodium, palladium, gold, silver, indium, platinum, iridium, rhenium, and niobium, and mixtures thereof. Preferred base metals include those selected from the group consisting of chromium (Cr), cerium (Ce), manganese (Mn), iron (Fe), cobalt (Co), nickel (Ni), and copper (Cu), and mixtures thereof. Preferably, at least one of the metals is copper (Cu). Other preferred metals include iron (Fe) and cerium (Ce), particularly in combination with copper (Cu). In another preferred embodiment, the base metal ions can be incorporated during the synthesis steps of a molecular sieve, such as |Cu| [Al—Si—P—O]-CHA.

The amount of metal in the material can be adjusted depending on the particular application and the particular metal. For example, molecular sieves of the present invention that are used as a mobile engine (e.g., diesel) SCR catalyst in an ammonia-based reductant system preferably include copper and/or iron. For embodiments utilizing copper, the molecular sieve contains about 0.5 to about 5 weight percent copper. For high temperature stationary applications, such as boilers, molecular sieves according to the present invention may include 0.1 to about 1.5 weight percent copper.

Preferably, the catalyst of the present invention is free or essentially free of extra-framework phosphorus. Examples of extra-framework phosphorus include phosphorus on the surface or within the pores of the molecular sieve, and include phosphorus added to the molecular sieve material by ion exchange, incipient wetness, spray drying, or other known techniques. By essentially free, it is meant that the catalyst does not contain extra-framework phosphorus in an amount that affects the catalyst's SCR or AMOX performance. In certain embodiments, the amount of extra-framework phosphorus is less than about 1.5 weight percent, preferably less than about 0.5 weight percent, more preferably less than about 0.1 weight percent, and even more preferably less than about 0.01 weight percent, based on the total weight of the molecular sieve.

Synthesis:

Low phosphorus CHA molecular sieves of the present invention can be synthesized during formation of the molecular sieve structure (i.e., in situ) or can be incorporated into a molecular sieve structure after it is formed (i.e., post molecular sieve synthesis).

In one embodiment of a post molecular sieve synthesis method, a low-phosphorus CHA molecular sieve is synthesized by modifying a starting material having a CHA framework and essentially no phosphorus, such as the aluminosilicate, SSZ-13. That is, phosphorus is incorporated into a sample of SSZ-13 by treating the SSZ-13 with one or more phosphorus modifying compounds under conditions effective to exchange a portion of the framework aluminum atoms for phosphorus atoms. For purposes of illustration of a synthesis method, reference will be made to SSZ-13 as a representative CHA molecular sieve. It is understood, however, that the starting materials of the present invention are not limited to SSZ-13.

In one embodiment of an in-situ method, the amount of framework phosphorus can be controlled by adjusting the stoichiometric ratio of the reagents. For example, adjusting the concentrations of the $Al_2O_3$ and $P_2O_5$ reagents relative to the $SiO_2$ reagent during the formation of molecular sieve via a conventional templating synthesis method and can produce a molecular sieve having a low amount of frame work phosphorus according to the present invention. In another example, the concentration of a non-phosphorus component, such as metal oxide (e.g., NaO) or other component to promote ion exchange during synthesis, can be adjusted during the formation of molecular sieve via a conventional templating synthesis method to produce a molecular sieve having a low amount of frame work phosphorus according to the present invention.

In another embodiment of an in-situ method, the order of reagent additions can be modified to control the amount of framework phosphorus in a molecular sieve. For example, the addition of a phosphorus containing component into a templating mixture prior to the addition of an alumina component can be used to modify the concentration of framework phosphorus.

In general, the number of cation exchange sites for such material is dependent upon the SAR and corresponding $PO_2$ molar ratio, as shown in Table 1.

TABLE 1

| Aluminosilicate CHA with low-level Phosphorus - Unit Cell Composition | | | | |
| --- | --- | --- | --- | --- |
| SiO2 | AlO2 | PO2 | SAR | Cation Exchange Sites per Unit Cell |
| 32 | 3 | 1 | 21.3 | 2 |
| 32 | 2 | 2 | 32 | 0 |
| 31 | 4 | 1 | 15.5 | 3 |
| 31 | 3 | 2 | 20.7 | 1 |
| 30 | 5 | 1 | 12 | 4 |
| 30 | 4 | 2 | 15 | 2 |
| 30 | 3 | 3 | 20 | 0 |

Molecular sieves with application in the present invention can include those that have been treated to improve hydrothermal stability. Conventional methods of improving hydrothermal stability include: (i) dealumination by steaming and acid extraction using an acid or complexing agent e.g. (EDTA—ethylenediaminetetracetic acid); treatment with acid and/or complexing agent; treatment with a gaseous stream of $SiCl_4$ (replaces Al in the molecular sieve framework with Si); and (ii) cation exchange—use of multi-valent cations such as lanthanum (La).

Applications:

The molecular sieve catalyst for use in the present invention can be in the form of a washcoat, preferably a washcoat that is suitable for coating a substrate, such as a metal or ceramic flow through monolith substrate or a filtering substrate, including for example a wall-flow filter or sintered metal or partial filter. Accordingly, another aspect of the invention is a washcoat comprising a catalyst component as described herein. In addition the catalyst component, washcoat compositions can further comprise a binder selected from the group consisting of alumina, silica, (non zeolite) silica-alumina, naturally occurring clays, $TiO_2$, $CeO_2$, $ZrO_2$, $SnO_2$, and mixtures of these.

In one embodiment, provided is a substrate upon which the molecular sieve catalyst is deposited. Preferred substrates for use in mobile application are monoliths having a so-called honeycomb geometry which comprises a plurality of adjacent, parallel channels, each channel typically having a square cross-sectional area. The honeycomb shape provides a large catalytic surface with minimal overall size and pressure drop. The molecular sieve catalyst can be deposited on and/or in a flow-through monolith substrate (e.g., a honeycomb monolithic catalyst support structure with many small, parallel channels running axially through the entire part) or filter monolith substrate such as a wall-flow filter, etc. In another embodiment, the molecular sieve catalyst is deposited on and/or in a plate substrate for stationary applications, such as gas turbines and coal-fired power plants. In another embodiment, the molecular sieve catalyst is formed into an extruded-type catalyst. Preferably, the molecular sieve catalyst is coated on a substrate in an amount sufficient to reduce the NOx contained in an exhaust gas stream flowing through the substrate. In certain embodiments, at least a portion of the substrate may also contain a platinum group metal, such as platinum (Pt), to oxidize ammonia in the exhaust gas stream.

The molecular sieves for use in the present invention also can be synthesized directly onto the substrate.

The molecular sieve catalysts according to the invention also can be formed into an extruded-type flow through catalyst.

The catalytic molecular sieves described herein can promote the reaction of a reductant, preferably ammonia, with nitrogen oxides to selectively form elemental nitrogen ($N_2$) and water ($H_2O$) vis-à-vis the competing reaction of oxygen and ammonia. In one embodiment, the catalyst can be formulated to favor the reduction of nitrogen oxides with ammonia (i.e., and SCR catalyst). In another embodiment, the catalyst can be formulated to favor the oxidation of ammonia with oxygen (i.e., an ammonia oxidation (AMOX) catalyst). In yet another embodiment, an SCR catalyst and an AMOX catalyst are used in series, wherein both catalysts comprise the metal containing molecular sieve described herein, and wherein the SCR catalyst is upstream of the AMOX catalyst. In certain embodiments, the AMOX catalyst is disposed as a top layer on an oxidative under-layer, wherein the under-layer comprises a platinum group metal (PGM) catalyst or a non-PGM catalyst.

The reductant (also known as a reducing agent) for SCR processes broadly means any compound that promotes the reduction of NOx in an exhaust gas. Examples of reductants useful in the present invention include ammonia, hydrazine or any suitable ammonia precursor, such as urea (($NH_2$)$_2$CO), ammonium carbonate, ammonium carbamate, ammonium hydrogen carbonate or ammonium formate, and hydrocarbons such as diesel fuel, and the like. Particularly preferred reductants are nitrogen based, with ammonia being particularly preferred.

According to another aspect of the invention, provided is a method for the reduction of NOx compounds or oxidation of $NH_3$ in a gas, which comprises contacting the gas with a catalyst composition described herein for the catalytic reduction of $NO_x$ compounds for a time sufficient to reduce the level of $NO_x$ compounds in the gas. In one embodiment, nitrogen oxides are reduced with the reducing agent at a temperature of at least 100° C. In another embodiment, the nitrogen oxides are reduced with the reducing agent at a temperature from about 150 to 750° C. In a particular embodiment, the temperature range is from 175 to 650° C. In another embodiment, the temperature range is from 175 to 550° C. In yet another embodiment, the temperature range is 450 to 750° C., preferably 450 to 700° C., even more preferably 450 to 650° C. Embodiments utilizing temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the molecular sieve catalyst for use in the present invention is located downstream of the filter.

In certain embodiments, the catalyst can be used in processes that require very low $N_2O$ production. Specific applications include systems and methods for treating lean-burn exhaust gases at low temperatures such as below 200° C., below about 250° C., about 150 to about 300° C., or about 200° C. to about 400° C. Such systems include engines that have one or more major exhaust gas cycles within one of these temperature ranges, or exhaust systems or engines that are designed to treat exhaust gas within one of these ranges for a significant portion (e.g., at least 25%) or even a majority of their operational time. Other applications include engines or other combustion processes that tuned in a manner that produces large amounts of $NO_2$. In certain embodiments, the molecular sieve having a low amount of framework phosphorus, including methods and systems utilizing the same, produce less $N_2O$ compared to a similar catalyst material having no frame-work phosphorus, such as aluminosilicates. In certain embodiments, the $N_2O$ production is less than 5 ppm, more preferably less than about 1 ppm, and even more preferably less than about 0.1 ppm per 500 ppm NO being treated at a temperature less than about 400° C., more preferably from about 175° C. to about 375° C., such as about 200 to about 350° C. or about 200 to about 300° C.

In another embodiment, the nitrogen oxides reduction is carried out in the presence of oxygen. In an alternative embodiment, the nitrogen oxides reduction is carried out in the absence of oxygen.

The method can be performed on a gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

According to a further aspect, the invention provides an exhaust system for a vehicular lean burn internal combustion engine, which system comprising a conduit for carrying a flowing exhaust gas, a source of nitrogenous reductant, and a molecular sieve catalyst described herein. The system can include means, when in use, for controlling the metering means so that nitrogenous reductant is metered into the flowing exhaust gas only when it is determined that the molecular sieve catalyst is capable of catalyzing $NO_x$ reduction at or above a desired efficiency, such as at above 100° C., above 150° C. or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

In a particular embodiment, metering is controlled in response to the quantity of nitrogen oxides in the exhaust gas determined either directly (using a suitable NOx sensor) or indirectly, such as using pre-correlated look-up tables or maps—stored in the control means—correlating any one or more of the abovementioned inputs indicative of a condition of the engine with predicted $NO_x$ content of the exhaust gas. The metering of the nitrogenous reductant can be arranged such that 60% to 200% of theoretical ammonia is present in exhaust gas entering the SCR catalyst calculated at 1:1 $NH_3/NO$ and 4:3 $NH_3/NO_2$. The control means can comprise a pre-programmed processor such as an electronic control unit (ECU).

In a further embodiment, an oxidation catalyst for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR molecular sieve catalyst having a ratio of NO to $NO_2$ of from about 4:1 to about 1:3 by volume, e.g. at an exhaust gas temperature at oxidation catalyst inlet of 250 to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a molecular sieve such as an aluminosilicate molecular sieve, silica, non-zeolite silica alumina, ceria, zirconia, titania or a mixed or composite oxide containing both ceria and zirconia.

In a further embodiment, a suitable filter substrate is located between the oxidation catalyst and the molecular sieve catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the molecular sieve catalyst. Alternatively, if the filter is uncatalyzed, the means for metering nitrogenous reductant can be located between the oxidation catalyst and the filter.

In a further embodiment, the molecular sieve catalyst for use in the present invention is coated on a filter located downstream of the oxidation catalyst. Where the filter includes the molecular sieve catalyst for use in the present invention, the point of metering the nitrogenous reductant is preferably located between the oxidation catalyst and the filter.

In a further aspect, there is provided a vehicular lean-burn engine comprising an exhaust system according to the present invention. The vehicular lean burn internal combustion engine can be a diesel engine, a lean-burn gasoline engine or an engine powered by liquid petroleum gas or natural gas.

EXAMPLES

To better understand the invention, the following non-limiting examples are provided for illustrative purposes.

Example 1—In-Situ Synthesis of a Low-Phosphorus CHA Molecular Sieve

A sol-gel reaction composition was prepared by combining 75.80 g fumed silica with 500 g de-mineralized water with stirring until homogeneous. Approximately 5.27-5.89 g sodium aluminate was dissolved in 209.11 g of N,N,N-trimethyl-1-adamantammonium hydroxide, TMADOH (25.5 wt. %) followed by the dissolution of 6.75-7.10 g sodium hydroxide. To the base solution 0.364-1.091 g orthophosphoric acid (85 wt. %) was homogenized. Still under stirring the silica source was added to the base solution followed by 240 g de-mineralized water and the mixture left to stir until homogeneous. The pH was measured before charging to a stainless steel pressure reactor. Finally, under stirring, de-min water was added to the reactor until the sol-gel reached the following molar composition:

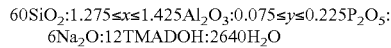

$60SiO_2:1.275 \leq x \leq 1.425Al_2O_3:0.075 \leq y \leq 0.225P_2O_5:$
$6Na_2O:12TMADOH:2640H_2O$ The reactor was purged with nitrogen and the mixture crystallized at 170° C. after 3 days.

This procedure was repeated using the relative amounts of reagents shown in Table 2.

2° C./minute and under drying conditions, then increasing the temperature of the material to 450° C. at a rate of 5° C./minute, holding the material at 450° C. for 16 hours, the further increasing the temperature of the material to 550° C. at a rate of 5° C./minute and holding the material at 550° C. for another 16 hours. The material was then allowed to cool to room temperature again.

The cooled material was loaded with copper by weight via an incipient wetness process.

The ion-exchanged material was then activated by increasing the temperature of the material from room temperature to 150° C. at a rate of 2° C./minute, holding the material at 150° C. for 16 hours, then increasing the temperature of the material to 450° C. at a rate of 5° C./minute, holding the material at 450° C. for 16 hours. The material was then allowed to cool to room temperature again.

Example 2—In-situ Synthesis of a Low-Phosphorus CHA Molecular Sieve

A sol-gel reaction composition was prepared by combining 75.80 g fumed silica with 500 g de-mineralized water with stirring until homogeneous. Approximately 5.27 g sodium aluminate was dissolved in 209.11 g of N,N,N-trimethyl-1-adamantammonium hydroxide, TMADOH (25.5 wt. %) followed by the dissolution of 0.37-7.10 g sodium hydroxide. To the base solution 1.091 g orthophosphoric acid (85 wt. %) was homogenised. Still under stirring the silica source was added to the base solution followed by 240 g de-mineralized water and the mixture left to stir until homogeneous. The pH was measured before charging to a stainless steel pressure reactor. Finally, under stirring, de-min water was added to the reactor until the sol-gel reached the following molar composition:

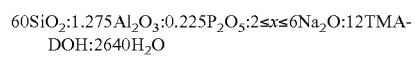

$60SiO_2:1.275Al_2O_3:0.225P_2O_5:2 \leq x \leq 6Na_2O:12TMA\text{-}$
$DOH:2640H_2O$

TABLE 2

In-situ Synthesis
(components expressed in mol. %)

| Example | SiO2 | Al2O3 | Fe2O3 | P2O5 | Na2O | NaNO3 | Tri-Me ADAM OH | H2O |
|---|---|---|---|---|---|---|---|---|
| 1a | 60 | 1.425 | 0 | 0.075 | 6 | 0 | 12 | 2640 |
| 1b | 60 | 1.3875 | 0 | 0.1125 | 6 | 0 | 12 | 2640 |
| 1c | 60 | 1.35 | 0 | 0.15 | 6 | 0 | 12 | 2640 |
| 1d | 60 | 1.3125 | 0 | 0.1875 | 6 | 0 | 12 | 2640 |
| 1e | 60 | 1.275 | 0 | 0.225 | 6 | 0 | 12 | 2640 |

These experiments produce a molecular sieve having a CHA framework and a very low amount of framework phosphorus.

The materials were calcined increasing the temperature of the material from room temperature to 110° C. at a rate of The reactor was purged with nitrogen and the mixture crystallized at 170° C. after 3 days.

This procedure was repeated using the relative amounts of reagents shown in Table 3.

TABLE 3

In-situ Synthesis
(components expressed in mol. %)

| Example | SiO2 | Al2O3 | Fe2O3 | P2O5 | Na2O | NaNO3 | Tri-Me ADAM OH | H2O |
|---|---|---|---|---|---|---|---|---|
| 2a | 60 | 1.275 | 0 | 0.225 | 6 | 0 | 12 | 2640 |
| 2b | 60 | 1.275 | 0 | 0.225 | 5 | 0 | 12 | 2640 |

TABLE 3-continued

In-situ Synthesis
(components expressed in mol. %)

| Example | SiO2 | Al2O3 | Fe2O3 | P2O5 | Na2O | NaNO3 | Tri-Me ADAM OH | H2O |
|---|---|---|---|---|---|---|---|---|
| 2c | 60 | 1.275 | 0 | 0.225 | 4 | 0 | 12 | 2640 |
| 2d | 60 | 1.275 | 0 | 0.225 | 3 | 0 | 12 | 2640 |
| 2e | 60 | 1.275 | 0 | 0.225 | 2 | 0 | 12 | 2640 |

These experiments produce a molecular sieve having a CHA framework and a very low amount of framework phosphorus.

The materials were calcined, ion-exchanged with copper, and then activated using a process similar to that described in Example 1.

Example 3—In-Situ Synthesis of a Low-Phosphorus CHA Molecular Sieve

A sol-gel reaction composition was prepared by two methods:

(a) combining 75.80 g fumed silica with 500 g de-min water with stirring until homogeneous. 5.27 g sodium aluminate was dissolved in 209.11 g of N,N,N-trimethyl-1-adamantammonium hydroxide, TMADOH (25.5 wt. %) followed by the dissolution of 7.10 g sodium hydroxide. To the base solution 1.091 g orthophosphoric acid (85 wt. %) was homogenised. Still under stirring the silica source was added to the base solution followed by 240 g de-min water and the mixture left to stir until homogeneous. The pH was measured before charging to a stainless steel pressure reactor. Finally, under stirring, de-min water was added to the reactor until the sol-gel reached the following molar composition:

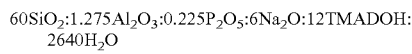

The reactor was purged with nitrogen and the mixture crystallized at 170° C. after 3 days; and (b) combining 75.80 g fumed silica with 500 g de-min water with stirring until homogeneous followed by the addition of 1.091 g orthophosphoric acid (85 wt. %). 5.27 g sodium aluminate was dissolved in 209.11 g of N,N,N-trimethyl-1-adamantammonium hydroxide, TMADOH (25.5 wt. %) followed by the dissolution of 7.10 g sodium hydroxide. Still under stirring the silica source was added to the base solution followed by 240 g de-min water and the mixture left to stir until homogeneous. The pH was measured before charging to a stainless steel pressure reactor. Finally, under stirring, de-min water was added to the reactor until the sol-gel reached the following molar composition:

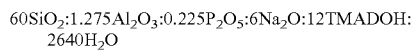

The reactor was purged with nitrogen and the mixture crystallized at 170° C. after 3 days.

The materials were calcined, ion-exchanged with copper, and then activated using a process similar to that described in Example 1

Example 3—SCR Activity

The fresh and aged |Cu| [Al—Si—P—O]-CHA material was tested using a Synthetic Catalyst Activity Test (SCAT) rig under the following conditions: 500 ppm NO, 500 ppm $NH_3$, 10% $O_2$, 10% $H_2O$ and the balance $N_2$; and a space velocity (SV) of 60,000/hour. For comparison, similar testing was performed on a sample of copper loaded SSZ-13.

Figure 2:
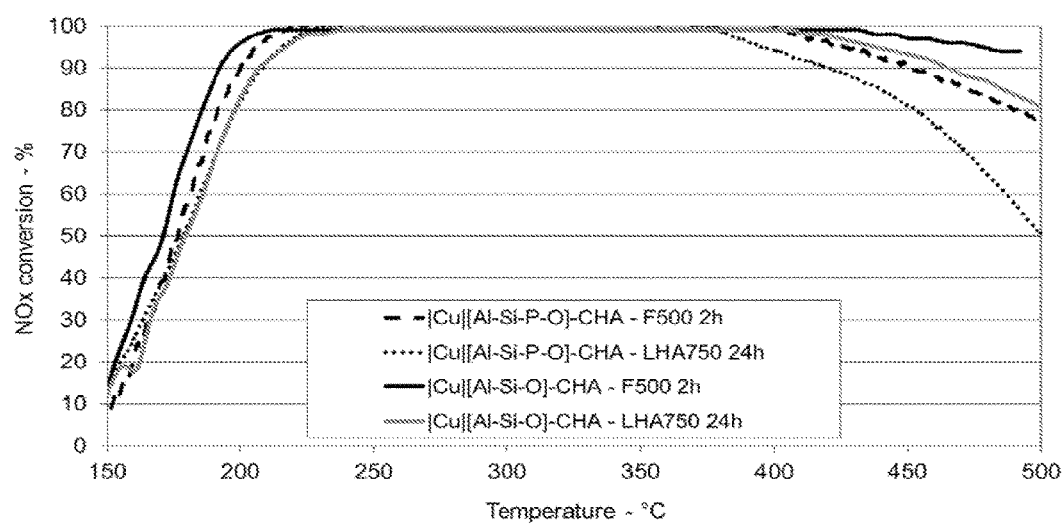
FIG. 2 is a graphical representation of $NO_x$ conversion data associated with one embodiment of the invention.
Figure 3:
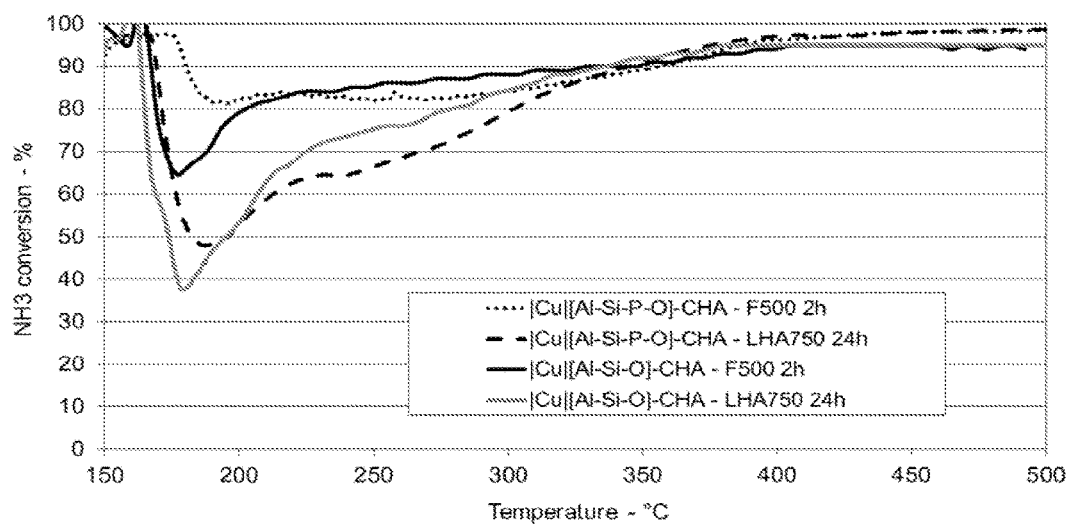
FIG. 3 is a graphical representation of $NH_3$ conversion data associated with one embodiment of the invention.
Figure 4:
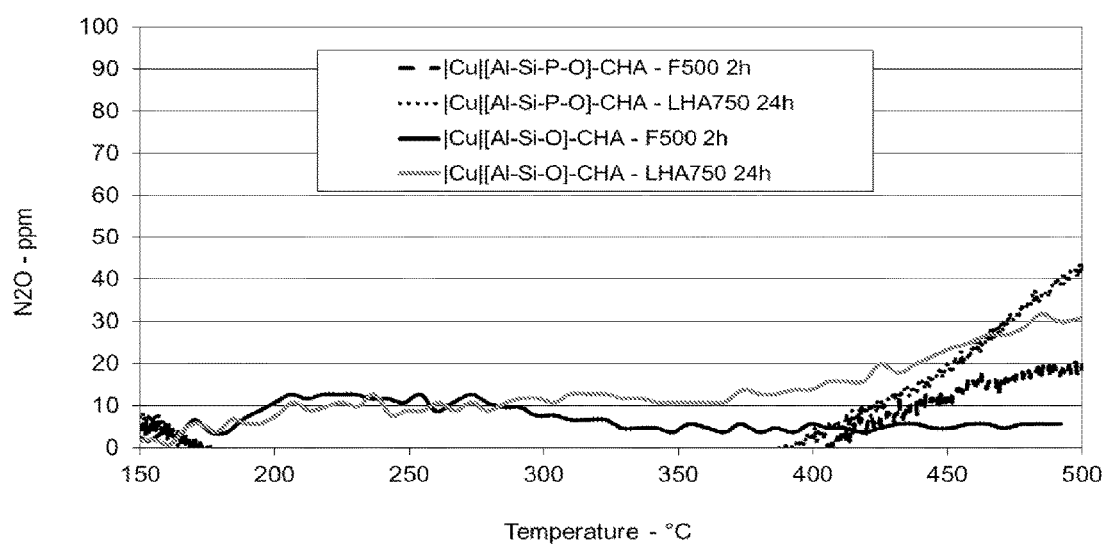
FIG. 4 is a graphical representation of $N_2O$ generation data associated with one embodiment of the invention.

The samples were tested to determine $NO_x$ conversion, $NH_3$ conversion, and $N_2O$ production, each as a function of temperature. $NO_x$ conversion data is shown in FIG. 2, $NH_3$ conversion data is shown in FIG. 3, and $N_2O$ production data is shown in FIG. 4.

The results show that the |Cu| [Al—Si—P—O]-CHA material according to the present invention and SSZ-13 have comparable performance.

Example 4—Synthesis of a Low-Phosphorus CHA Molecular Sieve

Additional synthesis of low-phosphorus CHA molecular sieve are conducted to produce materials having about 0.05 mol % phosphorus, 0.10 mol % phosphorus, 0.25 mol % phosphorus, 0.50 mol % phosphorus, and 1.0 mol % phosphorus.

What is claimed is:

1. A method for reducing NOx in an exhaust gas comprising contacting the gas with a catalyst for a time and temperature sufficient to reduce the level of NOx compounds in the gas, wherein the catalyst is a catalyst comprising a composition comprising a molecular sieve material having a CHA framework, wherein the framework consists of periodic building units having 36 interlinked T-atoms selected from the group consisting of aluminum, silicon, and phosphorous, and wherein said molecular sieve material has a mean phosphorous concentration of about 0.5 to about 1.5 atoms per periodic building unit.

2. The method of claim 1, wherein said mean phosphorus concentration is about 1.0 to about 1.5 atoms per periodic building unit.

3. The method of claim 1, wherein said molecular sieve material has a silica-to-alumina ratio of at least about 10.

4. The method of claim 1, wherein said molecular sieve material has a silica-to-alumina ratio of at least about 10 and an Al:P ratio of greater than about 1.

5. The method of claim 1, wherein said molecular sieve material has a silica-to-alumina ratio of at least about 10 and an Al:P ratio of greater than about 10.

6. The method of claim 1, wherein said molecular sieve material has a silica-to-alumina ratio of at least about 10 and an Al:P ratio of greater than about 100.

7. The method of claim 1, wherein said phosphorus is connected to at least a portion of said aluminum via oxygen bridges.

8. The method of claim 1, wherein said molecular sieve material further comprises a non-aluminum base metal.

9. The method of claim 8, wherein said non-aluminum base metal is ion-exchanged.

10. The method of claim 9, wherein said non-aluminum base metal is copper.

11. The method of claim 9 wherein said non-aluminum base metal is iron.

12. An engine exhaust gas treatment system comprising:
 a. a catalyst article comprising a catalytically active washcoat on a monolith substrate, wherein the catalytically active washcoat comprises
  i. a molecular sieve material having:
   1. a CHA framework;
   2. about 0.5 to about 5.0 mol % phosphorous based on the total moles of framework silicon, aluminum, and phosphorous in said molecular sieve;
   3. $SiO_2$ and $Al_2O_3$ in a mol ratio of at least about 10;
   4. an aluminum to phosphorous ratio of at least about 1; and
   5. about 0.025 to about 5 w/w % of copper and/or iron on an anhydrous molecular sieve basis; and
  ii. one or more promoters or stabilizers; and
 b. a source of ammonia or urea upstream of said catalyst article.

13. The engine exhaust gas treatment system of claim 12, wherein the monolith substrate comprises a wall flow filter substrate.

14. The engine exhaust gas treatment system of claim 12, wherein the monolith substrate comprises a flow-through substrate.

15. The engine exhaust gas treatment system of claim 12, wherein said molecular sieve comprises about 0.05 to about 1.0 mole percent of framework phosphorus based on the total moles of framework silicon, aluminum, and phosphorus in said molecular sieve.

16. The engine exhaust gas treatment system of claim 12, wherein said molecular sieve material has a silica-to-alumina ratio of at least about 10 and an Al:P ratio of greater than about 1.

17. The engine exhaust gas treatment system of claim 12, wherein said molecular sieve material has a silica-to-alumina ratio of at least about 10 and an Al:P ratio of greater than about 10.

18. The engine exhaust gas treatment system of claim 12, wherein said molecular sieve material has a silica-to-alumina ratio of at least about 10 and an Al:P ratio of greater than about 100.

19. The engine exhaust gas treatment system of claim 12, wherein said copper or iron is ion exchanged.

20. The engine exhaust gas treatment system of claim 12, wherein said molecular sieve material contains ion exchanged copper.

\* \* \* \* \*